H. F. ENGELLAND.
CORN HARVESTING MACHINE.
APPLICATION FILED MAY 19, 1909.
934,511.
Patented Sept. 21, 1909.
3 SHEETS—SHEET 1.
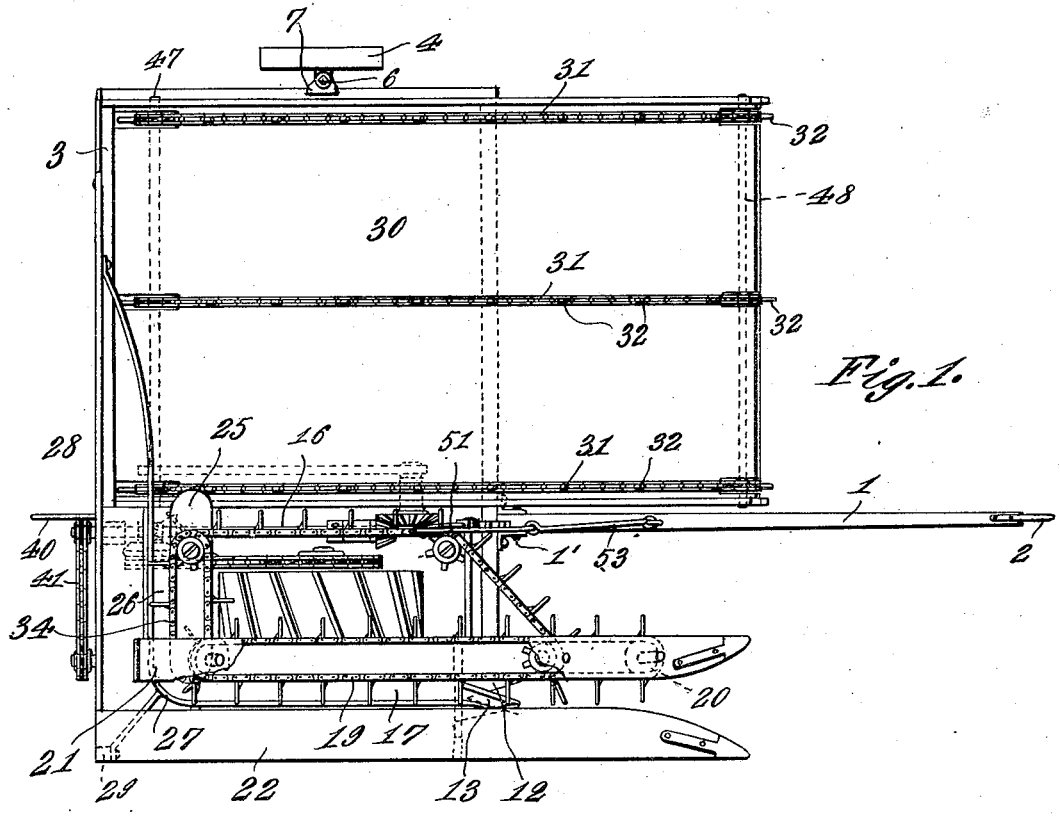
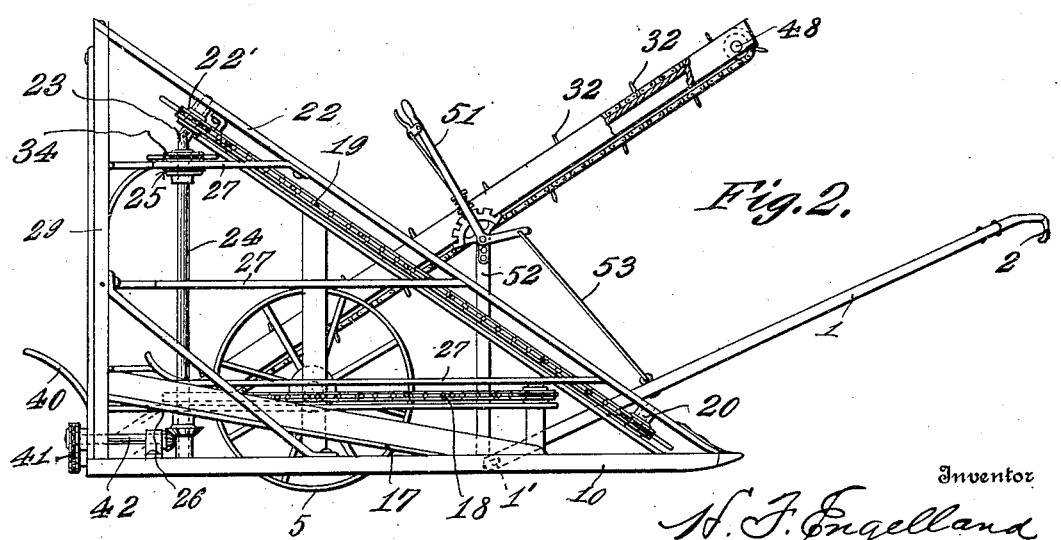
Witnesses
E. Larson
S. E. Dodge
Inventor
H. F. Engelland
By Beeler & Robb
Attorneys

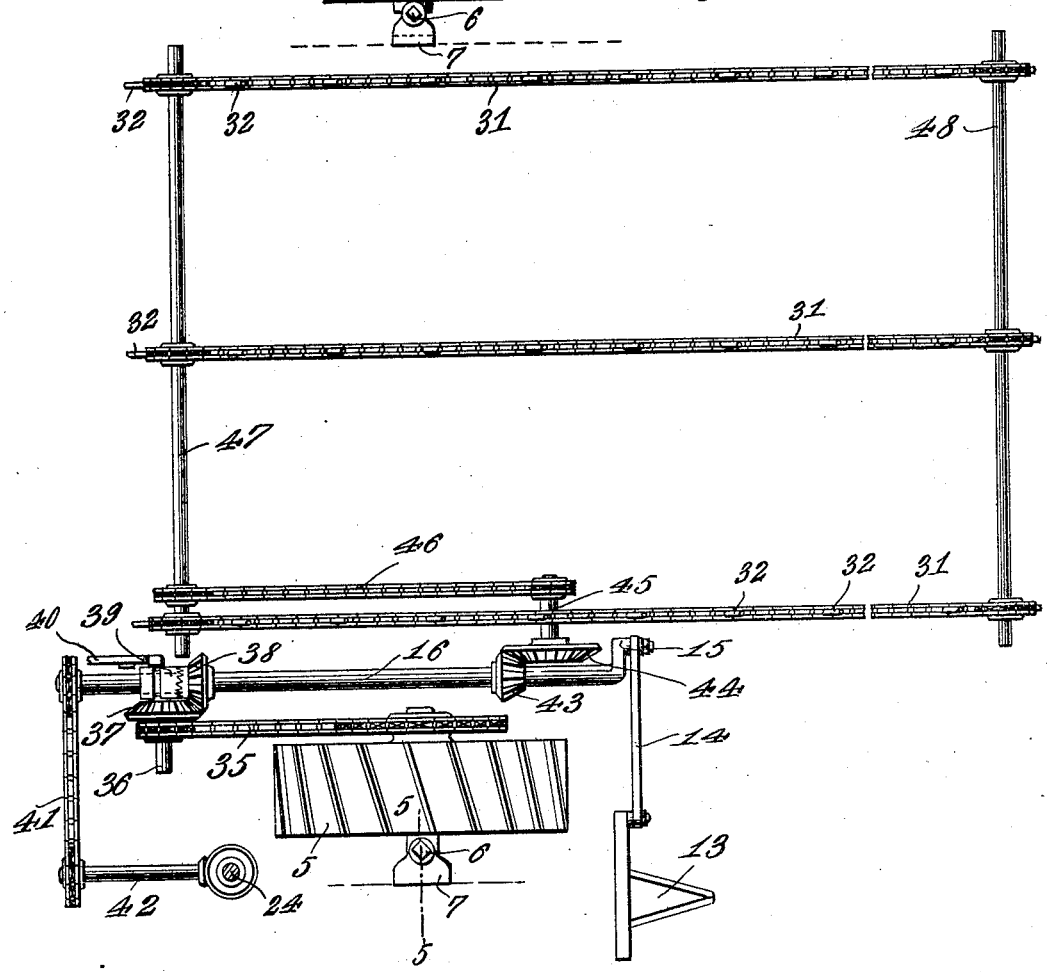

H. F. ENGELLAND.
CORN HARVESTING MACHINE.
APPLICATION FILED MAY 19, 1909.
934,511.
Patented Sept. 21, 1909.
3 SHEETS—SHEET 3.
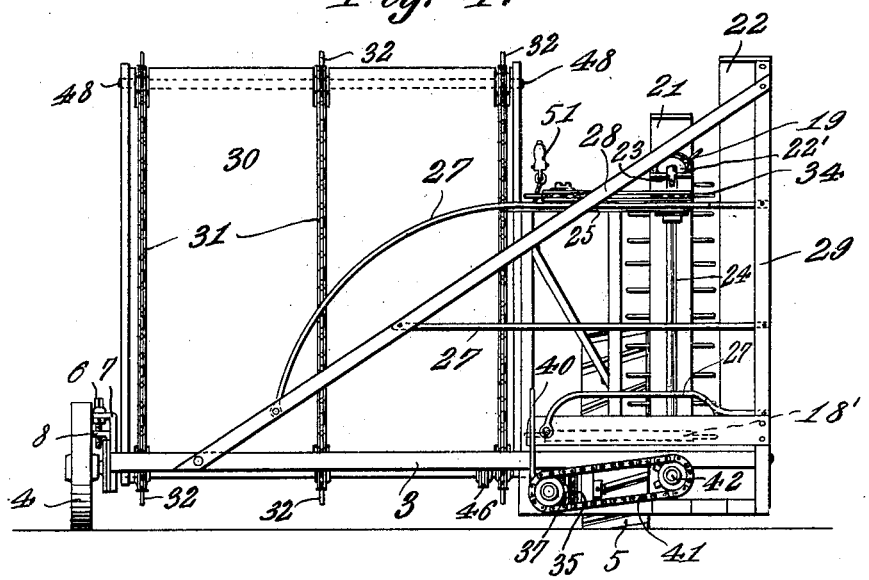

UNITED STATES PATENT OFFICE.

HENRY FRED ENGELLAND, OF MISHICOT, WISCONSIN.

CORN-HARVESTING MACHINE.

934,511.  Specification of Letters Patent.  Patented Sept. 21, 1909.

Application filed May 19, 1909. Serial No. 497,099.

*To all whom it may concern:*

Be it known that I, HENRY FRED ENGELLAND, a citizen of the United States, residing at Mishicot, in the county of Manitowoc and State of Wisconsin, have invented certain new and useful Improvements in Corn-Harvesting Machines, of which the following is a specification.

This invention relates to certain improvements in that type of machines for harvesting corn designed to be attached to and used in connection with a wagon or similar vehicle by which the machine is advanced over the field, the invention involving suitable cutting apparatus severing the stalks, an elevator for loading the stalks into the wagon and means for conveying the cut stalks to the elevator from the cutting devices.

The present invention resides particularly in the peculiar mechanisms above referred to whereby the operation of harvesting corn is facilitated, and in certain detailed features of construction of the machine that will be pointed out more fully hereinafter.

For a full understanding of the invention, including the operation and specific construction of parts, reference is to be had to the following detailed description, and to the accompanying drawings, in which:—

Figure 1 is a top plan view of a corn harvester embodying all the essential features of the invention; Fig. 2 is a side elevation of the machine; Fig. 3 is a top plan view showing in a diagrammatic manner the drive mechanism for the cutting apparatus, conveyer devices and the elevator which embodies the customary endless carriers, mounted upon a suitable frame; Fig. 4 is a rear elevation of the machine; Fig. 5 is a fragmentary sectional view, and partially in elevation, taken about on the line 5—5 of Fig. 3; Fig. 6 is a section taken about on the line 6—6 of Fig. 5; and Fig. 7 is a sectional view bringing out more clearly the relative arrangement of the cutting knives.

Throughout the drawings and description, similar reference characters refer to similar parts.

The machine comprising this invention embodies a draft tongue 1, the front end portion of which has a hook 2, or similar member, to engage with suitable means arranged on the right side of the wagon which will be connected with the tongue 1 and arranged in front of the machine to pull the same over the field while in operation. The machine embodies suitable frame-work 3 supported upon wheels 4 and 5, the latter being a drive-wheel for operating the associated mechanisms of the machine and having a broad tread, as shown most clearly in Figs. 1, 3 and 4. In order to adjust the position of the frame 3 and cutting devices mounted thereon with reference to the ground, it is contemplated to use some means such as illustrated in Figs. 5 and 6 of the drawings and including an adjusting screw 6 mounted in a bracket 7 on the frame 3, said screw being connected with a hanger 8 or similar member having a bearing for the axle 9 upon which the adjacent ground wheel may be mounted. It will be apparent that by operation of the screws 6, the frame 3 may be raised or lowered readily for the above mentioned purpose.

As customary in machines of this type, it is contemplated to employ the spaced guides 10 and 11 between which the stalks of corn pass or are received as the machine advances over the field, said guides diverging slightly at their front ends. As the stalks pass between the guides 10 and 11, they are operated upon by the cutting mechanism which consists of a stationary knife 12 secured to the under sides of these guides, and a reciprocating knife 13 arranged between the knife 12 and said guides, as shown most clearly in Fig. 7, the knife 13 being operated by means of a pitman rod 14 secured at one end to said knife 13 and having its other end attached to the crank 15 of a shaft 16 mounted in suitable bearings on the frame work of the machine arranged longitudinally thereof.

Above the guides 10 and 11 is a stalk supporting platform 17 on which the stalks move rearwardly after they have been cut, a horizontal conveyer chain 18, provided with suitable fingers to positively engage the stalks being mounted adjacent to and above the guide 11, so as to positively move the lower ends of the stalks rearwardly, said chain coöperating with a similar, inclined chain 19, the lower end of which passes about an idler 20 attached to the lower portion of an inclined frame-piece 21, the upper end of the chain 19 passing about a gear 22' connected by a universal connection 23 with a vertical drive-shaft 24 mounted on the rear portion of the guide 11 and supported in suitable bearings on said guide and in an arm 25 projecting from the part 21. The chain 18 after passing about a sprocket gear on the lower end of the shaft 24 extends laterally from the rear end of the guide 11, as shown at 18', and then about an idler on a transverse stalk-supporting platform 26 which projects laterally from the platform 17. Curved rods 27 have their front ends attached to the inclined frame-piece 22 which has been disposed above the guide 10, the rear end of one of said curved rods being secured to an inclined brace 28 at the rear end of the machine, said brace connecting the lower portion of the frame 3 and the upper end of the rear post 29, shown in Fig. 4. It will thus be seen that the stalks when cut are received on the platform 17 and are carried rearwardly by the conveyer chains 18 and 19, said chains having suitable fingers engaging the upper and lower portions of the stalks to effect positive movement thereof. As the stalks reach the rear end portion of the platform 17, the curved guide rods 27 guide them laterally and they are moved toward the elevator 30 which is adapted to receive the stalks as they fall from the platform 26, said elevator having the endless chains 31 provided with lifting fingers 32 and adapted to carry the stalks upward until they drop from the upper end of the elevator into the wagon hitched to the tongue 1. While the lower conveyer chain 18 passes about four sprocket gears, one being carried by the shaft 24 and the three others being idlers mounted on the frame, the upper conveyer chain 19 only passes about two gears numbered 20 and 22', as above described. At its upper end, the conveyer chain 19 is adjacent to an upper horizontal conveyer chain 34 arranged transverse with reference to said chain 19 and having fingers adapted to engage the upper portions of the stalks as the latter pass onto the platform 26. Three conveyer chains in all are thus provided to effect transfer of the stalks from the cutting devices to the elevator.

The driving mechanism for the various parts of the machine is shown clearly in Fig. 3 of the drawings and consists of the drive-wheel 5 aforesaid which is connected by a chain or belt connection 35 with a short shaft 36 having a bevel gear 37 engaging a bevel gear 38 loose on the crank shaft 16. A clutch member 39 operated by a lever 40, shown in Figs. 1, 2 and 3, is secured to the shaft 16 and adapted to connect the drive wheel 5 operatively with the cutting devices and elevating mechanisms. When the clutch member 39 is engaged with the gear 38, it will be apparent that the shaft 16 is rotated and operates the cutting knife 13. Since the shaft 16 at its rear end is connected by a chain 41 with a short longitudinal shaft 42, and said shaft 42 is connected by bevel gears to the shaft 24, it will be apparent that the last mentioned shaft will be operated during the operation of the cutting devices, thereby imparting movement to the various conveyer chains which are all operated from the shaft 24. The bevel gear 43 on the shaft 16 meshes with a similar gear 44 on a short shaft 45, the latter being connected by a drive-chain 46 with the lower shaft 47 of the elevator 30. Carrier chains 31 pass about the shaft 47 as well as an upper shaft 48 and the elevator is thus driven from the shaft 16 also.

In order that the frame of the machine may be adapted for further adjustment permitting attachment of the tongue 1 to the different wagons or vehicles, it is contemplated that the lower end of the tongue 1 be pivoted to the frame 3 of the machine, as shown at 1', and a hand lever 51 mounted on the upper end of a post 52 and connected by a rod 53 with the tongue 1, is adapted to be operated and adjusted to vary the relative positions of the tongue 1 and the frame, for the purpose just referred to.

Having thus described the invention, what is claimed as new is:—

1. In a corn harvester, the combination of an elevator, spaced guides at one side of said elevator, cutting knives mounted thereon, a longitudinal stalk supporting platform to receive stalks passing between said guides, a transverse stalk supporting platform extending laterally from the rear end of the in-of the longitudinal platform, a lower horizontal conveyer chain having fingers to engage the stalks projecting above the longitudinal platform, said chain extending laterally above the rear transverse platform and thence forwardly, an inclined conveyer chain above the longitudinal portion of the horizontal conveyer chain aforesaid, a vertical drive shaft, driving gears mounted on the lower and upper portions of said shaft, the lower gear engaging the lower conveyer chain, an upper horizontal conveyer chain passing about the upper drive gear and extending laterally from the rear end of the inclined upper conveyer chain aforesaid, and a driving connection between the inclined conveyer chain and the vertical drive shaft.

2. In a corn harvester, the combination of an elevator, stalk guides arranged in spaced relation at one side of said elevator, cutting mechanism adjacent to the guides, means for conveying cut stalks from the cutting mechanism onto the elevator, and driving means for the aforesaid mechanisms consisting of a longitudinal crank shaft, a pitman connection between said crank shaft and the cutting mechanism, a drive wheel supporting the machine and connected with said crank shaft, means for connecting and disconnecting the crank shaft with respect to the drive-wheel, a vertical shaft mounted adjacent to the rear end of the guides, upper and lower longitudinal conveyer chains above the guides, a transverse conveyer chain extending laterally from the rear end of the upper conveyer chain aforesaid, a vertical shaft operatively connected with all of said conveyer chains, and connecting means between said vertical shaft and the crank shaft for driving the conveyer chains from the drivewheel.

3. In a corn harvester, the combination of a frame, ground wheels therefor, an elevator mounted thereon, cutting mechanism, means for conveying stalks from the cutting mechanism to the elevator embodying longitudinal and transverse chains, stalk supporting platforms beneath said chains, and guide members co-acting to convey the stalks to the elevator and comprising longitudinal portions and laterally curving portions, the latter portions being parallel to the transverse conveyer chain and extending to the elevator.

In testimony whereof I affix my signature in presence of two witnesses.

HENRY FRED ENGELLAND.

Witnesses:
 EMMA R. ZEMAN,
 MAX W. BIGEL.